United States Patent
Wang et al.

(10) Patent No.: US 10,282,045 B2
(45) Date of Patent: May 7, 2019

(54) TOUCH PANEL, MANUFACTURING METHOD THEREOF AND TOUCH DISPLAY DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventors: Yanfeng Wang, Beijing (CN); Xue Dong, Beijing (CN); Dan Wang, Beijing (CN); Yun Qiu, Beijing (CN); Xiaoling Xu, Beijing (CN); Yuanxin Du, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/562,329

(22) PCT Filed: Mar. 3, 2017

(86) PCT No.: PCT/CN2017/075598
§ 371 (c)(1),
(2) Date: Sep. 27, 2017

(87) PCT Pub. No.: WO2018/018890
PCT Pub. Date: Feb. 1, 2018

(65) Prior Publication Data
US 2018/0348903 A1 Dec. 6, 2018

(30) Foreign Application Priority Data

Jul. 28, 2016 (CN) .......................... 2016 1 0607545

(51) Int. Cl.
*G06F 3/044* (2006.01)

(52) U.S. Cl.
CPC .... *G06F 3/044* (2013.01); *G06F 2203/04103* (2013.01); *G06F 2203/04112* (2013.01)

(58) Field of Classification Search
CPC .................. G06F 3/044; G06F 3/0416; G06F 2203/04101; H03K 17/962;
(Continued)

(56) References Cited

U.S. PATENT DOCUMENTS

2010/0164900 A1* 7/2010 Lin ......................... G06F 3/044
 345/174
2010/0233930 A1* 9/2010 Ishida ................... G06F 3/0412
 445/24
(Continued)

FOREIGN PATENT DOCUMENTS

| CN | 202771407 U | 3/2013 |
|---|---|---|
| CN | 202904526 U | 4/2013 |

(Continued)

OTHER PUBLICATIONS

International Search Report and Written Opinion dated Jun. 5, 2017; PCT/CN2017/075598.

*Primary Examiner* — Shaheda A Abdin
(74) *Attorney, Agent, or Firm* — Ladas & Parry LLP; Loren K. Thompson (57) ABSTRACT

A touch panel, a manufacturing method thereof and a touch display device are provided. The touch panel comprises: a base substrate, and a driving electrode and a sensing electrode disposed on the base substrate, wherein the driving electrode includes a plurality of first conducting wires and a first conductive bus for connecting the plurality of first conducting wires, the sensing electrode includes a plurality of second conducting wires and a second conductive bus for connecting the plurality of second conducting wires, and the (Continued)

plurality of first conducting wires and the plurality of second conducting wires are alternately arranged.

20 Claims, 6 Drawing Sheets

(58) Field of Classification Search
CPC .......... H03K 2017/9602; H03K 2217/960775; G01R 27/2605
See application file for complete search history.

(56) References Cited

U.S. PATENT DOCUMENTS

2014/0131067 A1* 5/2014 Liu .................... H05K 3/048
  174/251
2014/0218637 A1* 8/2014 Gao .................... G06F 3/044
  349/12
2014/0354301 A1 12/2014 Trend

FOREIGN PATENT DOCUMENTS

| CN | 104182102 A | 12/2014 |
| CN | 104216582 A | 12/2014 |
| CN | 105320320 A | 2/2016 |

* cited by examiner

TOUCH PANEL, MANUFACTURING METHOD THEREOF AND TOUCH DISPLAY DEVICE

TECHNICAL FIELD

Embodiments of the present invention relate to a touch panel, a manufacturing method thereof and a touch display device.

BACKGROUND

In the touch control field, a method of adopting metal meshes as driving electrodes and sensing electrodes of a touch panel has been widely applied.

However, when the metal meshes are applied to the touch panel, the metal meshes are usually disposed in different layers, resulting in intersection between metal wires and metal wires and intersection between the metal wires and a black matrix (BM) layer. Thus, many problems, e.g., Moiré effect and the problem relating to the light transmittance, may be caused.

Currently, the problems of Moiré effect and light transmittance are only solved by reducing a line width of metal mesh lines. However, due to the structural limitation of the metal meshes, the means of only reducing the line width of the metal mesh lines will result in the increase of the manufacturing process difficulty and the production cost. Moreover, the reduction of the line width of the metal mesh lines to be very low tends to result in the problems of broken metal wires, poor ability in resisting electrostatic breakdown, etc.

SUMMARY

At least one embodiment of the present invention provides a touch panel, comprising: a base substrate; and a driving electrode and a sensing electrode disposed on the base substrate, wherein the driving electrode includes a plurality of first conducting wires and a first conductive bus for connecting the plurality of first conducting wires, the sensing electrode includes a plurality of second conducting wires and a second conductive bus for connecting the plurality of second conducting wires, and the plurality of first conducting wires and the plurality of second conducive wires are alternately arranged.

For example, in the touch panel provided by at least one embodiment of the present invention, the plurality of first conducting wires and the plurality of second conducting wires are parallel to each other.

For example, the touch panel provided by at least one embodiment of the present invention further comprises: a black matrix, disposed on the base substrate, wherein orthographic projections of the first conductive bus and the second conductive bus on the base substrate are located within orthographic projection of the black matrix on the base substrate.

For example, the touch panel provided by at least one embodiment of the present invention further comprises: a color filter layer, wherein orthographic projections of the plurality of first conducting wires and the plurality of second conducting wires on the base substrate are located within orthographic projections of the black matrix and the color filter layer on the base substrate.

For example, in the touch panel provided by at least one embodiment of the present invention, a line width of each of the first conducting wires is 50 nm-140 nm, and a line width of each of the second conducting wires is 50 nm-140 nm.

For example, in the touch panel provided by at least one embodiment of the present invention, a distance between any two adjacent conducting wires in the first conducting wires and the second conducting wires is 50 nm-140 nm.

For example, in the touch panel provided by at least one embodiment of the present invention, orthographic projections of the plurality of first conducting wires and the plurality of second conducting wires on the base substrate are located within the orthographic projection of the black matrix on the base substrate.

For example, in the touch panel provided by at least one embodiment of the present invention, a line width of each of the first conducting wires and a line width of each of the second conducting wires are 50 nm-10 μm.

For example, in the touch panel provided by at least one embodiment of the present invention, at least every two of adjacent first conducting wires of the plurality of first conducting wires constitute a first conducting wire group, at least every two of adjacent second conducting wires of the plurality of second conducting wires constitute a second conducting wire group, and the first conducting wire group and the second conducting wire group are alternately arranged.

For example, in the touch panel provided by at least one embodiment of the present invention, a vertical distance between the first conductive bus and the second conductive bus is 2.5 mm-3.5 mm.

For example, in the touch panel provided by at least one embodiment of the present invention, the vertical distance between any two adjacent first conductive buses is 7.5 mm-8.5 mm.

For example, in the touch panel provided by at least one embodiment of the present invention, the plurality of first conducting wires and the plurality of second conducting wires are arranged in a same layer.

For example, in the touch panel provided by at least one embodiment of the present invention, the plurality of first conducting wires and the plurality of second conducting wires are arranged in different layers, and an insulating layer is further disposed between the plurality of first conducting wires and the plurality of second conducting wires.

At least one embodiment of the present invention provides a touch display device, comprising the touch panel as mentioned above, further comprising: gate lines and data lines disposed on the base substrate, wherein the first conducting wires and the second conducting wires are parallel to the data lines and the first conductive bus and the second conductive bus are parallel to the gate lines; or the first conducting wires and the second conducting wires are parallel to the gate lines and the first conductive bus and the second conductive bus are parallel to the data lines.

At least one embodiment of the present invention provides a touch display device, comprising the touch panel as mentioned above, further comprising: an array substrate arranged opposite to the base substrate, wherein the array substrate includes gate lines and data lines, the first conducting wires and the second conducting wires are parallel to the data lines and the first conductive bus and the second conductive bus are parallel to the gate lines; or the first conducting wires and the second conducting wires are parallel to the gate lines and the first conductive bus and the second conductive bus are parallel to the data lines.

At least one embodiment of the present invention provides a method for manufacturing a touch panel, comprising: providing a base substrate; and forming a driving electrode and a sensing electrode on the base substrate, wherein the driving electrode includes a plurality of first conducting wires and a first conductive bus for connecting the plurality of first conducting wires, the sensing electrode includes a plurality of second conducting wires and a second conductive bus for connecting the plurality of second conducting wires, and the plurality of first conducting wires and the plurality of second conducting wires are alternately arranged.

For example, in the method for manufacturing the touch panel provided by at least one embodiment of the present invention, the plurality of first conducting wires and the plurality of second conducting wires are parallel to each other.

For example, in the method for manufacturing the touch panel provided by at least one embodiment of the present invention, the first conducting wires and the second conducting wires are formed by nanoimprint or holographic lithography.

For example, the method for manufacturing the touch panel provided by at least one embodiment of the present invention further comprises: forming a black matrix on the base substrate, wherein orthographic projections of the first conductive bus and the second conductive bus on the base substrate are located within an orthographic projection of the black matrix on the base substrate.

For example, the method for manufacturing the touch panel provided by at least one embodiment of the present invention further comprises: forming a color filter layer on the base substrate, wherein orthographic projections of the plurality of first conducting wires and the plurality of second conducting wires on the base substrate are located within orthographic projections of the black matrix and the color filter layer on the base substrate.

BRIEF DESCRIPTION OF THE DRAWINGS

Simple description will be given below to the accompanying drawings of the embodiments to provide a more clear understanding of the technical proposals of the embodiments of the present invention. It will be obvious to those skilled in the art that the drawings described below only involve some embodiments of the present invention but are not intended to limit the present invention.

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Unless otherwise defined, all the technical and scientific terms used herein have the same meanings as commonly understood by one of ordinary skill in the art to which the present disclosure belongs. The terms, such as "first," "second," or the like, which are used in the description and the claims of the present disclosure, are not intended to indicate any sequence, amount or importance, but for distinguishing various components. The terms, such as "comprise/comprising," "include/including," or the like are intended to specify that the elements or the objects stated before these terms encompass the elements or the objects and equivalents thereof listed after these terms, but not preclude other elements or objects. The terms, such as "connect/connecting/connected," "couple/coupling/coupled" or the like, are not limited to a physical connection or mechanical connection, but may include an electrical connection/coupling, directly or indirectly. The terms, "on," "under," or the like are only used to indicate relative position relationship, and when the position of the object which is described is changed, the relative position relationship may be changed accordingly.

At least one embodiment of the present invention provides a touch panel, a manufacturing method thereof and a touch display device. The touch panel comprises: a base substrate, and a driving electrode and a sensing electrode disposed on the base substrate, wherein the driving electrode includes a plurality of first conducting wires and a first conductive bus for connecting the plurality of first conducting wires; the sensing electrode includes a plurality of second conducting wires and a second conductive bus for connecting the plurality of second conducting wires; and the plurality of first conducting wires and the plurality of second conducting wires are alternately arranged.

In the touch panel, the sensing electrode and the driving electrode are designed into wire grid structures which are alternately arranged, which may avoid the Moiré effect caused by an intersection between a sensing electrode line and a driving electrode line, and meanwhile, the touch function can be achieved.

Figure 1:
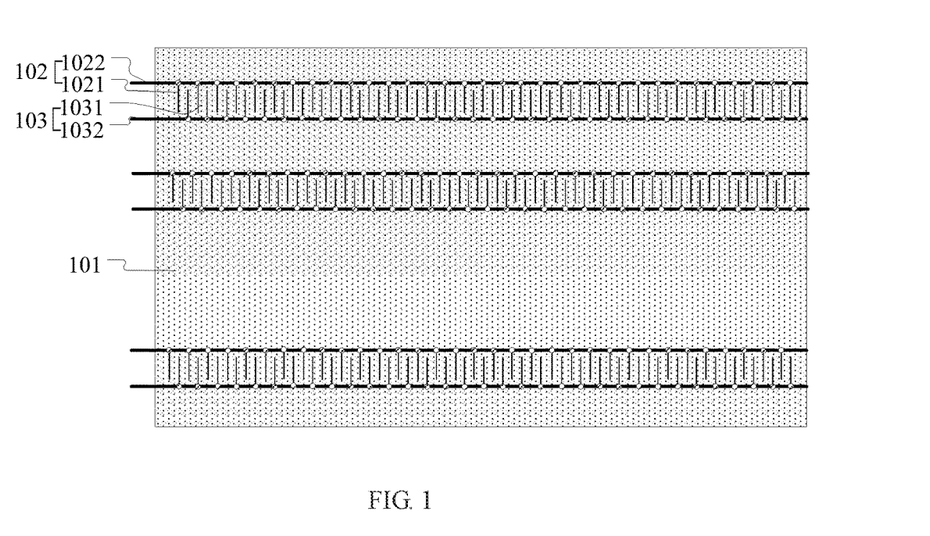
FIG. 1 is a schematic structural plan view of a touch panel provided by an embodiment of the present invention.

An embodiment of the present invention provides a touch panel. FIG. 1 is a schematic structural view of a touch panel provided by the embodiment. As illustrated in FIG. 1, the touch panel comprises: a base substrate 101, and a driving electrode 102 and a sensing electrode 103 disposed on the base substrate 101, wherein the driving electrode 102 includes a plurality of first conducting wires 1021 and a first conductive bus 1022 for connecting the plurality of first conducting wires 1021; the sensing electrode 103 includes a plurality of second conducting wires 1031 and a second conductive bus 1032 for connecting the plurality of second conducting wires 1032; and the plurality of first conducting wires 1021 and the plurality of second conducting wires 1031 are alternately arranged.

It should be noted that: in the embodiment, a case that the plurality of first conducting wires 1021 and the plurality of second conducting wires 1031 are alternately arranged includes the following cases: along a direction of the first conductive bus 1022, the second conducting wire is disposed on each of both sides of each first conducting wire (except a case that the first conducting wire is disposed at an edge); along a direction of the second conductive bus 1032, the first conducting wire is disposed on each of both sides of each second conducting wire (except a case that the second conducting wire is disposed at an edge); along the direction of the first conductive bus 1022, the second conducting wire is disposed on each of both sides of each first conducting wire (except a case that the first conducting wire is disposed at an edge), and along the direction of the second conductive bus 1032, the first conducting wire is disposed on each of both sides of each second conducting wire (except a case that the second conducting wire is disposed at an edge); and a plurality of adjacent first conducting wires 1021 are set to be one group and a plurality of adjacent second conducting wires 1031 are set to be another group, and the first conducting wire group formed by the first conducting wires 1021 and the second conducting wire group formed by the second conducting wires 1031 are adjacent to each other in one-to-one correspondence relationship.

For instance, as shown in FIG. 1, except the first conducting wire and the second conducting wire disposed at an edge, each of the plurality of first conducting wires 1021 is disposed between two adjacent second conducting wires 1031 of the plurality of second conducting wires, and each of the plurality of second conducting wires 1031 is disposed between two adjacent first conducting wires 1021 of the plurality of first conducting wires. That is to say, each of the first conducting wires 1021 is adjacent to the second conducting wire 1031, and each of the second conducting wires 1031 is adjacent to the first conducting wire 1021.

For instance, one, two or more than two of the second conducting wires 1031 may be disposed between two adjacent first conducting wires 1021, and/or one, two or more than two of the first conducting wires 1021 may be disposed between two adjacent second conducting wires 1031, on the premise of satisfying the touch function and accurate positioning. No limitation will be given here, namely the first conducting wires and the second conducting wires are not strictly arranged in one-to-one correspondence relationship.

For instance, a width of each of the plurality of first conducting wires and a width of each of the plurality of second conducting wires, and a distance between two adjacent conducting wires are not constant and may be in the range of 50 nm~10 μm.

Figure 2:
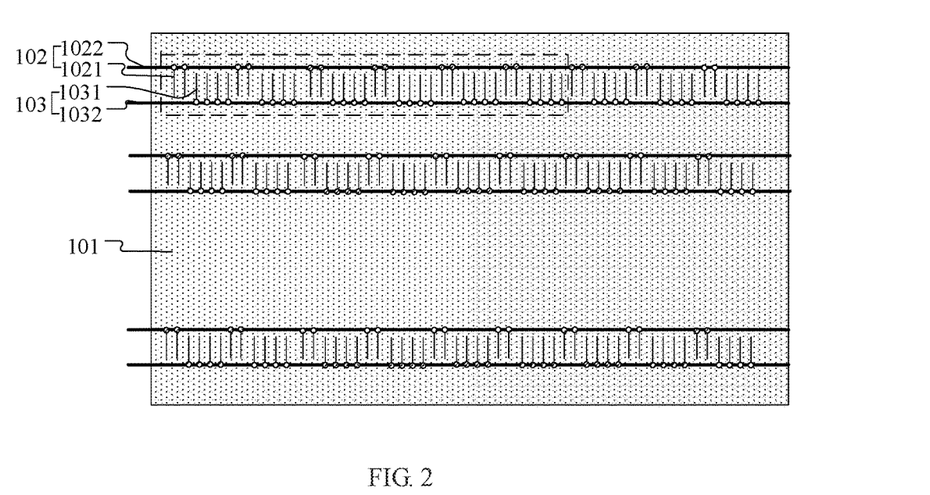
FIG. 2 is a schematic structural plan view of another touch panel provided by an embodiment of the present invention.

For instance, FIG. 2 is a schematic structural view of another touch panel provided by the embodiment. As shown in FIG. 2, a plurality of adjacent first conducting wires 1021 are set to be one group, a plurality of adjacent second conducting wires 1031 are set to be another group, and two groups are alternately arranged. Each group of first conducting wires 1021 and each group of second conducting wires 1031 are arranged in one-to-one correspondence relationship.

For instance, one group, two groups or more than two groups of a plurality of groups of second conducting wires 1031 may be disposed between two adjacent groups of first conducting wires 1021, or one group, two group or more than two groups of a plurality of groups of first conducting wires 1021 may be disposed between two adjacent groups of second conducting wires 1031, on the premise of satisfying the touch function and accurate positioning. No limitation will be given here, namely each group of first conducting wires and each group of second conducting wires are not arranged in one-to-one correspondence relationship.

For instance, the number of the conducting wires in each group of first conducting wires and the number of the conducting wires in each group of second conducting wires are also not constant, and a width of the conducting wire and a distance between two adjacent conducting wires are also not constant.

Figure 3:
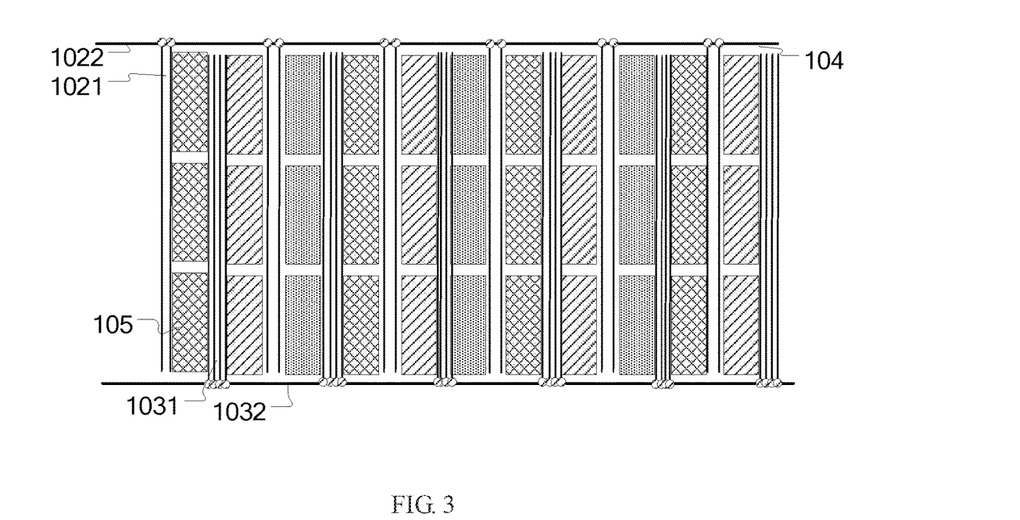
FIG. 3 is a schematic structural partially enlarged plan view of the touch panel in FIG. 2.

For instance, FIG. 3 is a schematic structural partially enlarged plan view of the touch panel as shown in FIG. 2. An enlarged region is a region as shown by a dotted line rectangular frame in FIG. 2. As illustrated in FIG. 3, the touch panel further comprises a black matrix 104 disposed on the base substrate 101, wherein orthographic projections of the first conductive bus 1022 and the second conductive bus 1032 on the base substrate 101 are located within an orthographic projection of the black matrix 104 on the base substrate 101. That is to say, the first conductive bus 1022 and the second conductive bus 1032 are arranged in a region corresponding to the black matrix 104, so light shielding can be avoided, and hence the light transmittance and the aperture ratio cannot be affected.

For instance, as shown in FIG. 3, the first conductive bus 1022, the second conductive bus 1032, the plurality of first conducting wires 1021 and the plurality of second conducting wires 1031 are all disposed in a region corresponding to the black matrix 104, so light shielding can be avoided, and hence the light transmittance and the aperture ratio cannot be affected.

For instance, the touch panel further comprises a color filter layer 105. The color filter layer 105 includes an array of color filter units (e.g., red color filter units, green color filter units and blue color filter units), and the color filter units may be spaced from each other through the black matrix. That is to say, the black matrix 104 are separated into a plurality of black matrix regions by the color filter layer 105; and one conducting wire with relatively large thickness may be disposed in each of the plurality of black matrix regions, or a plurality of thin conducting wires may also be disposed in the black matrix region. In a part of the plurality of black matrix regions, there is not the first conducting wire 1021 or the second conducting wire 1031 disposed. For instance, both a line width of the first conducting wires 1021 and the second conducting wires 1031 and a distance between two adjacent conducting wires are in the range of 50 nm~10 μm.

Figure 4:
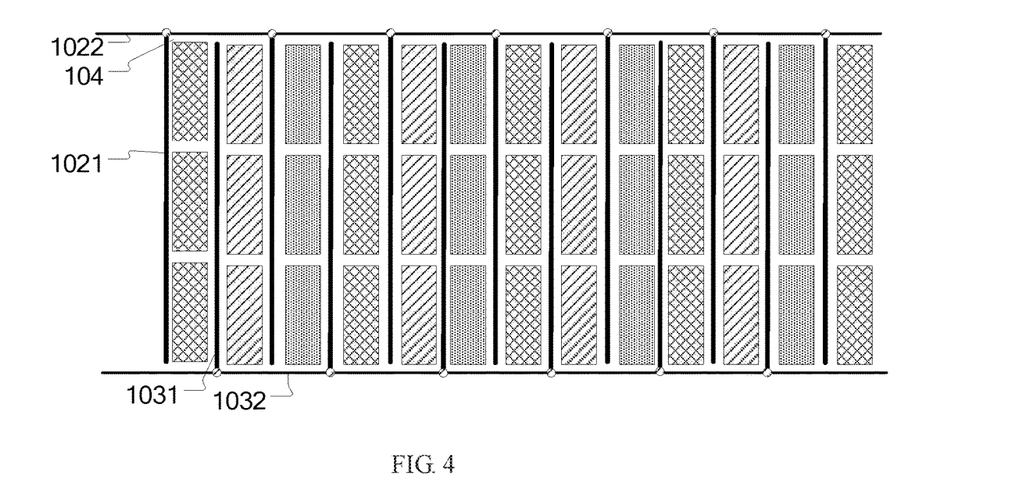
FIG. 4 is a schematic structural plan view of still another touch panel provided by an embodiment of the present invention.

For instance, as shown in FIG. 4, orthographic projections of the plurality of first conducting wires 1021 and the plurality of second conducting wires 1031 on the base substrate 101 are located within an orthographic projection of the black matrix 104 on the base substrate 101. The first conducting wires 1021 and the second conducting wires 1031 will not shield any light and affect the light transmittance and will also not affect the aperture ratio. No moiré effect will be generated among the black matrix, the first conducting wires 1021 and the second conducting wires 1031. The line width of the first conducting wire 1021 and the line width of the second conducting wire 1031 is both 50 nm~10 μm. For instance, in each of the black matrix regions, one relatively thick conducting wire is disposed, which can achieve completely the same effect as a setting manner in which a plurality of thin conducting wires is disposed in each of the black matrix regions.

For instance, as shown in FIGS. 1-4, a vertical distance of the first conductive bus and the second conductive bus is 2.5~3.5 mm, which means that a line length of the first conducting wire 1021 and a line length of the second conducting wire 1031 are 2.5~3.5 mm.

For instance, as shown in FIGS. 1-4, a vertical distance between two adjacent first conductive buses is 7.5~8.5 mm, which means that a distance between every two adjacent groups of sensing electrodes or every two adjacent groups of driving electrodes is 7.5~8.5 mm.

For instance, as shown in FIGS. 1-4, the plurality of first conducting wires and the plurality of second conducting wires are parallel to each other and alternately arranged in the same layer. No moiré effect may be generated between each of the first conducting wires and the black matrix or between each of the second conducting wires and the black matrix, and no moiré effect may be generated between each of the first conducting wires and each of the second conducting wires, namely the moiré effect can be completely eliminated.

For instance, as shown in FIGS. 1-4, the plurality of first conducting wires and the plurality of second conducting wires may also be arranged in different layers, and an insulating layer is also disposed between the plurality of first conducting wires and the plurality of second conducting wires in different layers. Similarly, no moiré effect may be generated between each of the first conducive wires and the black matrix or between each of the second conducting wires and the black matrix, and no moiré effect may be generated between each of the first conducting wires and each of the second conducting wires, namely the moiré effect can be completely eliminated.

A distance between each of the first conductive buses and the second conductive bus corresponding to the first conductive bus is very small and is between 2.5 and 3.5 mm, and a distance between each of the first conducting wires and the second conducting wire adjacent to the first conducting wire is also very small and is between 50 nm and 10 µm. When the touch panel is touched by a finger, a touch pen or an electric conductor having a certain contact region (greater than the distance between two adjacent conductive buses in a direction perpendicular to the conductive bus) with the touch panel, the touched conducting wires (including the first conducting wires, the second conducting wires, the first conductive bus and the second conductive bus) will have changes in capacitance. The changes of the capacitance sensed on different first conductive bus and different second conductive bus are different, and along an extension direction of each of the first conductive buses or an extension direction of each of the second conductive buses, the capacitance change can be sensed on the first conductive bus or the second conductive bus, so the touch position is determined according to the magnitude of the capacitance change.

In general, when the touch panel is touched by a finger, a touch pen or an electric conductor having a certain contact region (greater than the distance between two adjacent conductive buses in the direction perpendicular to the conductive buses) with the touch panel, a region of the touch panel provided with the conductive bus will always be touched, so that the touch position can be accurately determined. When the touch panel is touched by a finger, a touch pen or the like, if the first conductive bus or the second conductive bus cannot be touched, but the touch position is located on the first conducting wire or the second conducting wire or located in a region radiated by the conducting wire or bus, the capacitance change on the conductive bus connected with the conducting wire may be correspondingly sensed, so the touch position can be determined. Coordinates in a direction parallel to corresponding conductive bus may be determined, but coordinates in the direction perpendicular to the conductive bus can only be accurate to millimeter.

For instance, the embodiment further provides a touch display device. In the touch display device, a touch panel may be disposed on a color filter substrate and may also be disposed on an array substrate provided with a color filter layer. The touch panel not only may be disposed inside a display panel formed by cell-assembling the color filter substrate and the array substrate, but also may be disposed outside the display panel (namely on a side facing an user).

Figure 5:
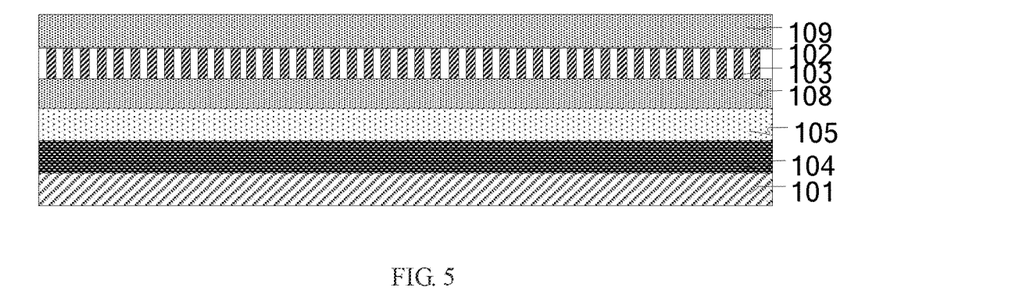
FIG. 5 is a schematic structural cross-sectional view of a touch display device provided by an embodiment of the present invention.

For instance, FIG. 5 is a schematic structural cross-sectional view of a touch display device. For instance, description is given here by taking a case that the touch panel in the touch display device is disposed outside the display panel as an example. A structure of the touch display device is that: a black matrix 104, a color filter layer 105, a first insulating layer 108, driving electrodes 102, sensing electrodes 103 and a second insulating layer 109 are sequentially arranged on a base substrate 101. It should be noted that the black matrix and the color filter layer may also be arranged in a same layer, and such structure is not shown in the figure.

In the embodiment, as a plurality of first conducting wires 1021 and a plurality of second conducting wires 1031 are in parallel alternately arranged, a problem of moiré effect between the conducting wires is solved; and as orthographic projections of the plurality of first conducting wires 1021 and the plurality of second conducting wires 1031 on the base substrate are located within an orthographic projection of the black matrix on the base substrate, the problem of moiré effect between the conducting wires and the black matrix can be eliminated.

It should be noted that: in the embodiment, materials of the first conducting wires, the second conducting wires, the first conductive bus and the second conductive bus may be conductive metal such as copper (Cu), aluminum (Al), molybdenum (Mo), silver (Ag), chromium (Cr) and titanium (Ti) or an alloy formed by the metals, e.g., copper-aluminum alloy (CuAl), copper-titanium alloy (CuTi), copper-molybdenum alloy (CuMo), chromium-molybdenum alloy (CrMo), aluminum-titanium alloy (AlTi) or aluminum-molybdenum alloy (AlMo). By using the metallic material, relatively small resistance can be obtained. If the resistance requirement is not high, for instance, metal oxide such as indium tin oxide (ITO) and indium zinc oxide (IZO) may also be adopted.

Figure 6:
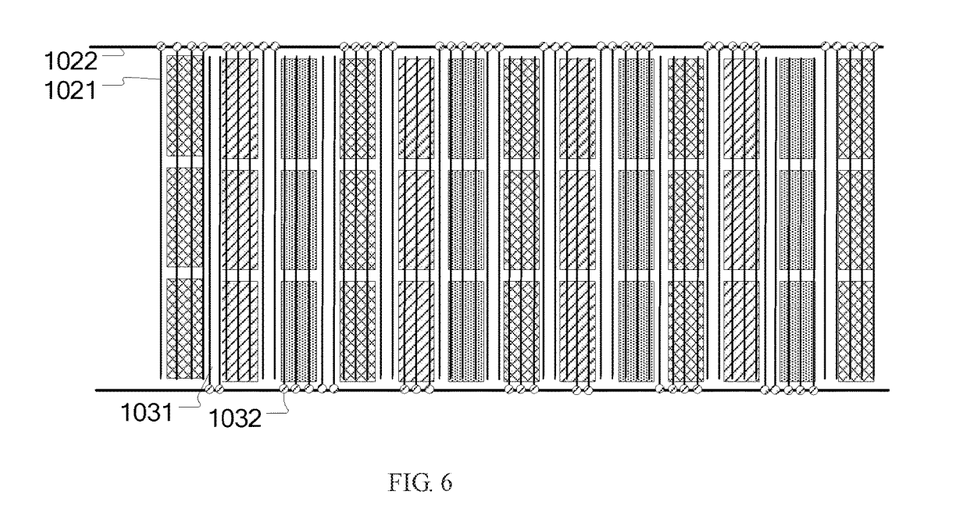
FIG. 6 is a schematic structural plan view of another touch display device provided by an embodiment of the present invention.

An embodiment of the present invention further provides another touch display device. FIG. 6 is a schematic structural plan view of another touch display device provided by the embodiment. In the touch display device, a touch panel may be disposed on a color filter substrate and may also be disposed on an array substrate provided with a color filter layer. The touch panel not only may be disposed inside a display panel formed by cell-assembling the color filter substrate and the array substrate, but also may be disposed outside the display panel. For instance, as shown in FIG. 6 taking a case that the touch panel is disposed on the color filter substrate as an example, the touch panel includes a black matrix 104 and a color filter layer 105; and orthographic projections of a plurality of first conducting wires 1021 and a plurality of second conducting wires 1031 on a base substrate 101 are located within an orthographic projection of the black matrix 104 and the color filter layer 105 on the base substrate 101.

For instance, as shown in FIG. 6, a line width of each of the first conducting wires 1021 is 50 nm-140 nm; a line width of each of the second conducting wires 1031 is 50 nm-140 nm; and both a thickness of each of the first conducting wires 1021 and a thickness of each of the second conducting wires 1031 are 50 nm-140 nm.

For instance, as shown in FIG. 6, a distance between two adjacent conducting wires in the plurality of first conducting wires 1021 and the plurality of second conducting wires 1031 is 50 nm-140 nm.

For instance, a length of each conducting wire in the plurality of first conducting wires 1021 and the plurality of second conducting wires 1031 is 2.5 mm-3.5 mm.

Thus, a plurality of parallel thin conductive wires with specific line width and line space may form a wire-grid polarizer (WGP), so as to convert transmitted light into polarized light applicable to a liquid crystal display (LCD) mode (namely a width, a thickness, an arrangement space and the like of the conducting wires are all set according to the polarized light required by the LCD mode). The thickness of the conducting wires in the WGP is in nanometer scale, and a length is in macro level, and the WGP may replace the traditional polarizer and be disposed in a layer structure, so sensing electrodes and driving electrodes are equivalent to be a small piece of polarizer. Thus, when the touch panel provided by the embodiment is applied to an LCD, a polarizer is not required to be attached to a side of the touch panel again, so as to reduce the product thickness and simplify the manufacturing process. Meanwhile, as the polarizer characteristics are optical characteristics when the conducting wires are arranged in a specified manner and are irrelevant to a voltage applied to the conducting wires, all the sensing electrodes and the driving electrodes may form a polarizer based on the polarization principle, namely simultaneously having a function of touch electrodes and the polarizer.

Based on the capacitive touch principle, a touch capacitor formed between the driving electrode and the sensing electrode may sense a touch action on a surface of the base substrate, and a touch position is determined according to a sensed position of the touch action, so as to achieve the touch function.

It should be understood that the plurality of first conducting wires 1021 and the plurality of second conducting wires 1031 included in the sensing electrode and the driving electrode in FIG. 6 may have other different designs according to a need of touch sensing. For instance, the number, an extension direction and a length of the conducting wires may have other different designs according to the polarization need. No limitation will be given here in the present disclosure.

In the embodiment, on the basis of the WGP and the sensing and driving electrodes which are multiplexed, the WGP may simultaneously achieve functions of the polarizer and the touch electrodes in an LCD product which originally needs a polarizer, which is equivalent to only modify patterns of wire grid in the polarizer and does not require the addition of new layer structure. Therefore, the embodiment can simplify the manufacturing process, reduce the product thickness, increase the light transmittance, and simultaneously reduce the moiré effect by multiplexing of the touch electrodes and the polarizer.

Figure 7:
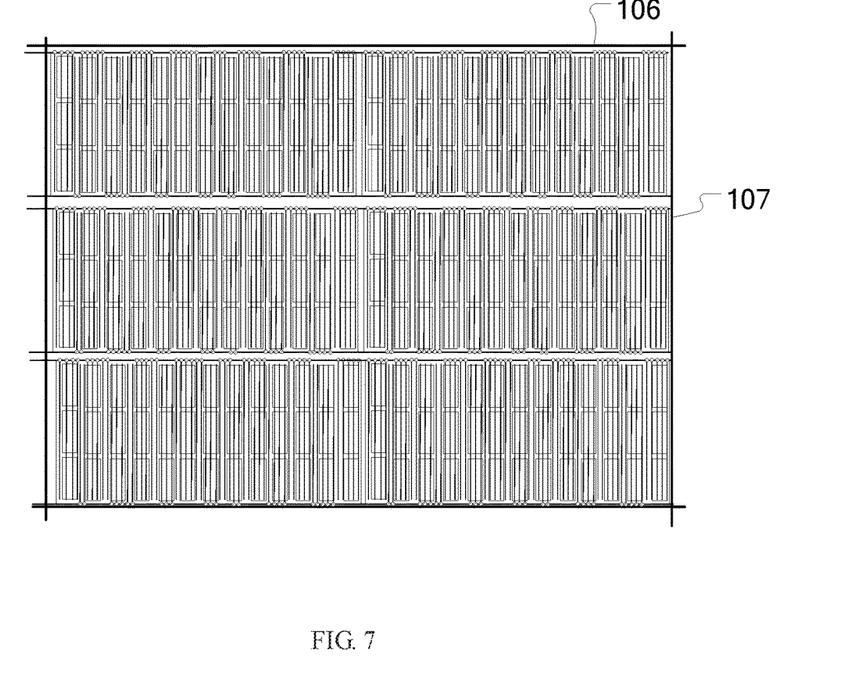
FIG. 7 is a schematic structural plan view of still another touch display device provided by an embodiment of the present invention.

For instance, as shown in FIG. 7 which is a schematic structural plan view of a touch display device provided by an embodiment of the present invention, in the touch display device, a touch panel is disposed on an array substrate, and the array substrate includes gate lines 106 and data lines 107 disposed on a base substrate 101, wherein first conducting wires 1021 and second conducting wires 1031 in the touch panel are parallel to the data lines 107 and a first conductive bus 1022 and a second conductive bus 1032 are parallel to the gate lines 106, or the first conducting wires 1021 and the second conducting wires 1031 are parallel to the gate lines 106 and the first conductive bus 1022 and the second conductive bus 1032 are parallel to the data lines 107. It should be noted that FIG. 7 only shows gate lines and data lines disposed in a peripheral region, and in a peripheral region of each subpixel, there are also the gate lines and the data lines (not shown) disposed.

For instance, the touch panel may also be disposed on a color filter substrate, and an array substrate (not shown) is arranged opposite to the color filter substrate. The array substrate includes gate lines, data lines and a plurality of pixel units. The gate lines and the data lines are intersected with each other to define the pixel units. Each pixel unit includes a switching element, a pixel electrode and other display drive structures. The first conducting wires and the second conducting wires are parallel to the data lines and the first conductive bus and the second conductive bus are parallel to the gate lines, or the first conducting wires and the second conducting wires are parallel to the gate lines and the first conductive bus and the second conductive bus are parallel to the data lines.

It should be noted that: in the embodiment, materials of the first conducting wires, the second conducting wires, the first conductive bus and the second conductive bus may be a conductive metal such as Cu, Al, Mo, Ag, Cr and Ti or an alloy formed by the metals, e.g., copper-aluminum alloy (CuAl), copper-titanium alloy (CuTi), copper-molybdenum alloy (CuMo), chromium-molybdenum alloy (CrMo), aluminum-titanium alloy (AlTi) or aluminum-molybdenum alloy (AlMo). By using the metallic material, relatively small resistance can be obtained. If the resistance requirement is not high, for instance, metal oxide such as indium tin oxide (ITO) and indium zinc oxide (IZO) may also be adopted.

An embodiment of the present invention further provides a method for manufacturing a touch panel. The method comprises: providing a base substrate, and forming a driving electrode and a sensing electrode on the base substrate, wherein the driving electrode includes a plurality of first conducting wires and a first conductive bus for connecting the plurality of first conducting wires; the sensing electrode includes a plurality of second conducting wires and a second conductive bus for connecting the plurality of second conducting wires; and the plurality of first conducting wires and the plurality of second conducting wires are alternately arranged.

For instance, the first conducting wires and the second conducting wires may be formed by nanoimprint and may also be formed by holographic lithography.

For instance, in the embodiment, materials of the first conducting wires, the second conducting wires, the first conductive bus and the second conductive bus may be a conductive metal such as Cu, Al, Mo, Ag, Cr and Ti or an alloy formed by the metals, e.g., copper-aluminum alloy (CuAl), copper-titanium alloy (CuTi), copper-molybdenum alloy (CuMo), chromium-molybdenum alloy (CrMo), aluminum-titanium alloy (AlTi) or aluminum-molybdenum alloy (AlMo). By using the metallic material, relatively small resistance can be obtained. If the resistance requirement is not high, for instance, metal oxide such as indium tin oxide (ITO) and indium zinc oxide (IZO) may also be adopted.

Figure 8A:
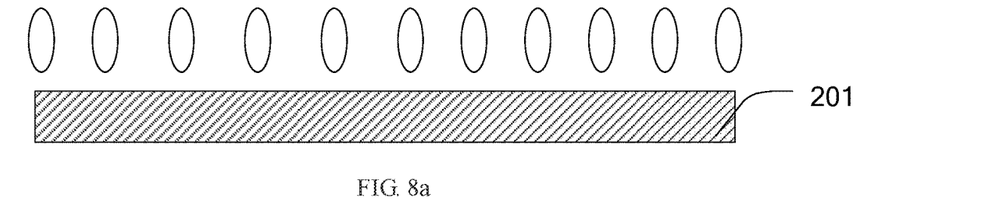
FIGS. 8a-8h are flow diagrams of a method for manufacturing conducting wires provided by an embodiment of the present invention.
Figure 8B:
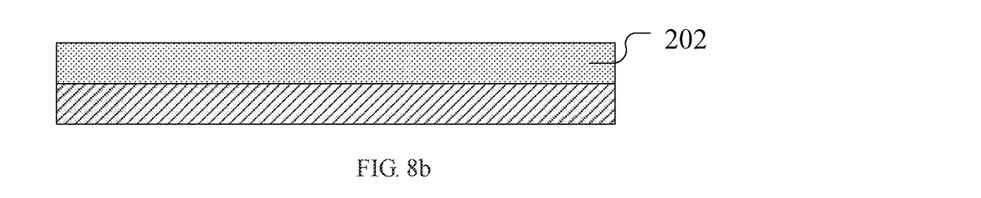
Figure 8C:
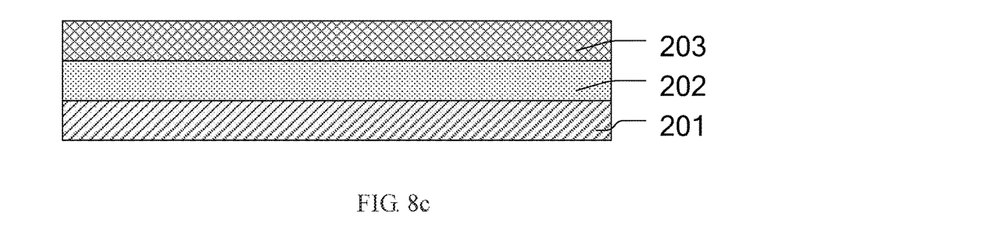
Figure 8D:
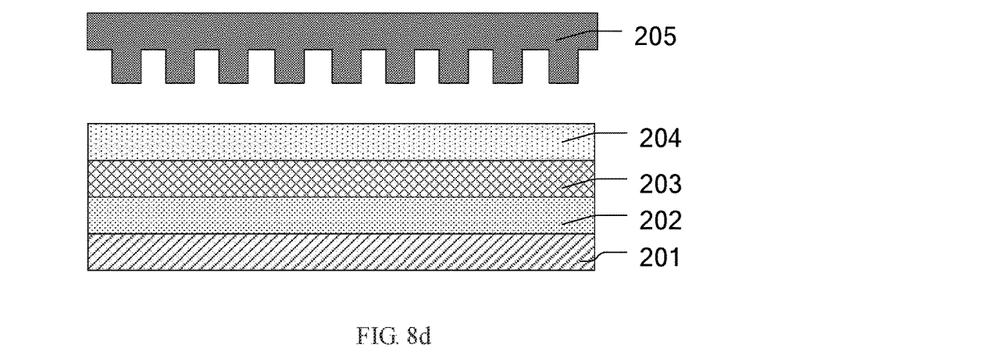
Figure 8E:
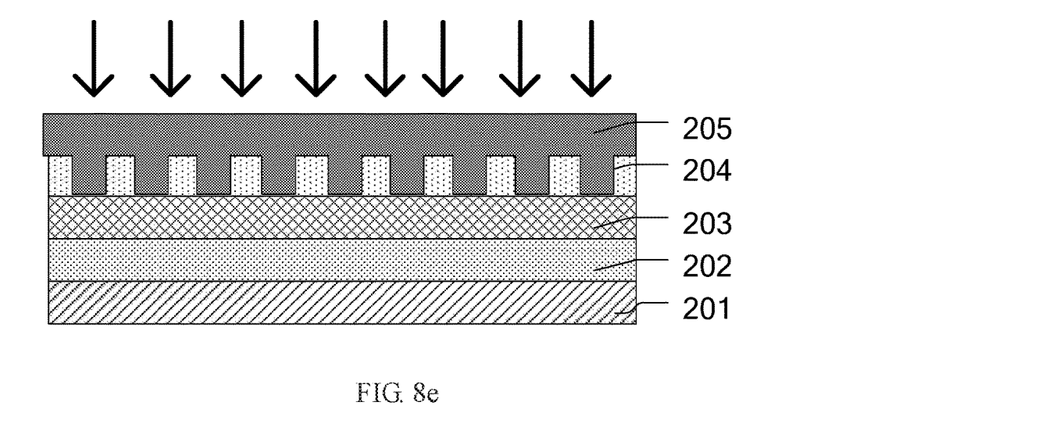
Figure 8F:
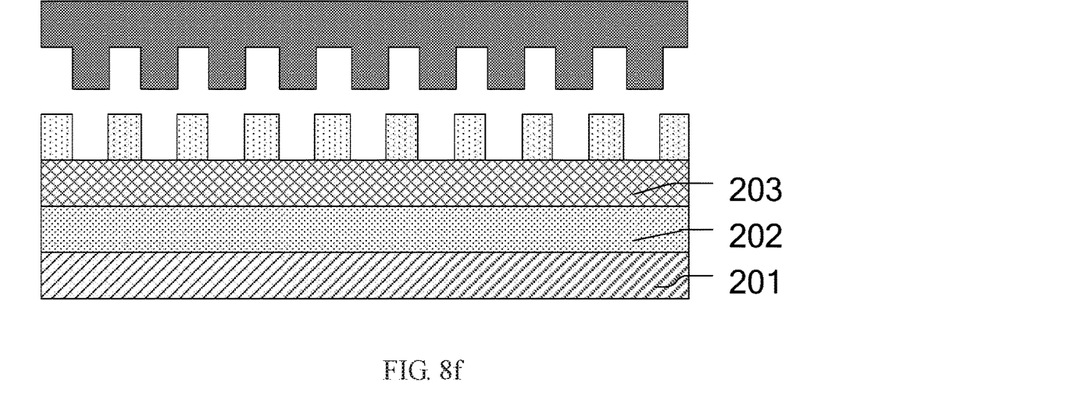
Figure 8G:
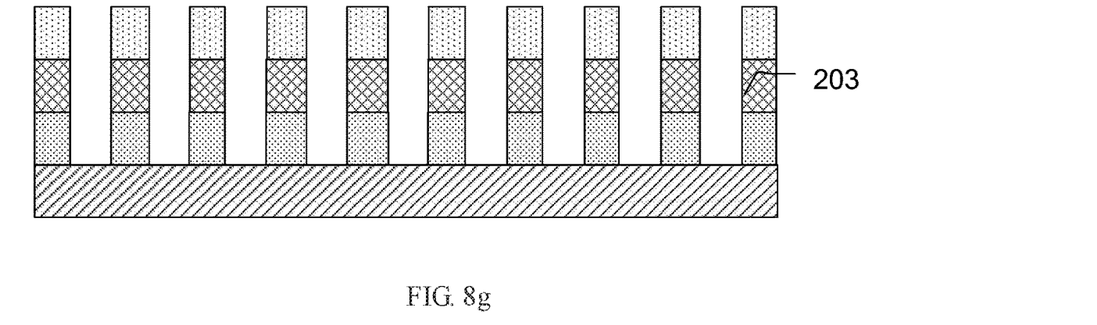
Figure 8H:
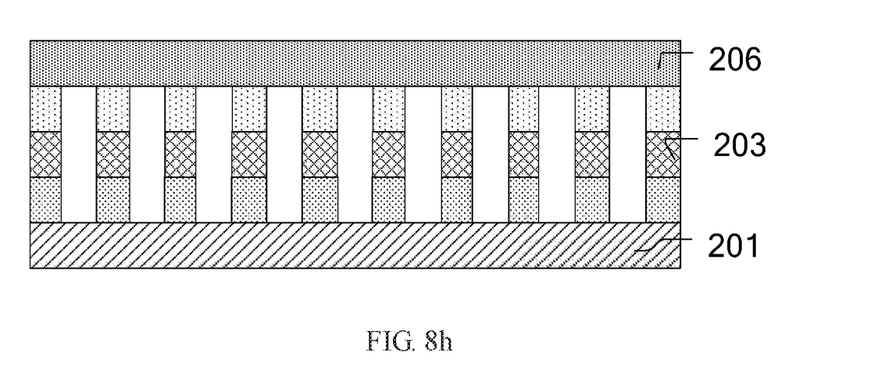

For instance, FIGS. 8a-8h are flow diagrams of a method for manufacturing a conducting wire provided by an embodiment of the present invention, namely flow diagrams illustrating processes of forming the first conducting wires and the second conducting wires. Description is given here by taking a case that the first conducting wires and the second conducting wires are made from metallic materials as an example. The manufacturing processes of the first conducting wires and the second conducting wires include:

as shown in FIG. 8a, cleaning a glass substrate 201;

as shown in FIG. 8b, forming a metal film 202 on the cleaned glass substrate 201, in which a film forming method may be sputtering, deposition, etc.;

as shown in FIG. 8c, forming a medium layer 203 on the glass substrate on which the metal film 202 is formed, in which a method of forming the medium layer may be coating, deposition, etc.;

as shown in FIG. 8d, forming a photoresist layer 204 on the medium layer, in which a method of forming the photoresist layer may be spin coating, spray coating, etc.;

as shown in FIG. 8e, pressing a mold 205 into photoresist, and performing nanoimprint process under the condition of heating or UV-irradiation curing;

as shown in FIG. 8f, forming a required photoresist pattern by separating the mold 205;

as shown in FIG. 8g, forming patterns of the conducting wires by etching the metal film and the medium layer; and as shown in FIG. 8h, forming a protective layer film 206 on the formed patterns of the conducting wires.

In the forming process, a line width and a length of the conducting wires are determined by a size of the selected mold. Forming the medium layer on the metal film mainly intends to improve the reflection and polarization performances of the conducting wires. The medium layer may be removed according to different requirements. An etching process may adopt a dry etching, for instance, etching the metal film and the medium layer by using corrosive plasmas.

The touch panel, the manufacturing method thereof and the touch display device, provided by the embodiments of the present invention, at least have one of the following advantages:

(1) In the touch panel, as the sensing electrodes and the driving electrodes are designed to be a wire grid structure in alternately arrangement, the moiré effect caused by the intersection between the first conducting wires and the second conducting wires can be avoided, and meanwhile, the touch function can be achieved.

(2) When the conducting wires are relatively thick and no WGP is formed, orthographic projections of the first conducting wires and the second conducting wires on the base substrate are located within orthographic projection of the black matrix on the base substrate, and both the first conducting wires and the second conducting wires are not intersected with the black matrix, so the moiré effect caused by the intersection between the conducting wires and the black matrix can be avoided.

(3) When the conducting wires are relatively thin and the WGP is formed, functions of the polarizer and the touch electrodes can be simultaneously achieved, and one polarizer lay can be omitted. Meanwhile, the conducting wires may be disposed on the color filter layer and the black matrix, and as the WGP has polarization characteristic, the light transmittance will not be affected.

The following points should be noted:

(1) The accompanying drawings in the embodiments of the present invention only involve structures relevant to the embodiments of the present invention, and other structures may refer to the prior art.

(2) For clarity, in the accompanying drawings of the embodiments of the present invention, the thickness of layers or regions is enlarged or reduced, namely the accompanying drawings are not drawn according to actual scales. It should be understood that: when an element such as a layer, a film, a region or a substrate is referred to as being disposed "on" or "beneath" another element, the element may be "directly" disposed "on" or "beneath" another element, or an intermediate element may be provided.

(3) The embodiments of the present invention and the characteristics in the embodiments may be mutually combined to obtain new embodiments without conflict.

The application claims priority to the Chinese patent application No. 201610607545.8, filed Jul. 28, 2016, the disclosure of which is incorporated herein by reference as part of the application.

The invention claimed is:

1. A touch panel, comprising:
a base substrate; and
a driving electrode and a sensing electrode disposed on the base substrate, wherein
the driving electrode includes a plurality of first conducting wires and a first conductive bus for connecting the plurality of first conducting wires, the sensing electrode includes a plurality of second conducting wires and a second conductive bus for connecting the plurality of second conducting wires, and the plurality of first conducting wires and the plurality of second conducive wires are alternately arranged,
wherein the first conductive bus and the second conductive bus are disposed to be parallel to each other, and in a direction parallel to an extending direction of the first conductive bus and the second conductive bus, the plurality of first conducting wires and the plurality of second conducting wires are alternately arranged.

2. The touch panel according to claim 1, wherein the plurality of first conducting wires and the plurality of second conducting wires are parallel to each other.

3. The touch panel according to claim 2, further comprising:
a black matrix, disposed on the base substrate,
wherein orthographic projections of the first conductive bus and the second conductive bus on the base substrate are located within orthographic projection of the black matrix on the base substrate.

4. The touch panel according to claim 3, further comprising:
a color filter layer,
wherein orthographic projections of the plurality of first conducting wires and the plurality of second conducting wires on the base substrate are located within orthographic projections of the black matrix and the color filter layer on the base substrate.

5. The touch panel according to claim 4, wherein a line width of each of the first conducting wires is 50 nm-140 nm, and a line width of each of the second conducting wires is 50 nm-140 nm.

6. The touch panel according to claim 3, wherein orthographic projections of the plurality of first conducting wires and the plurality of second conducting wires on the base substrate are located within the orthographic projection of the black matrix on the base substrate.

7. The touch panel according to claim 6, wherein a line width of each of the first conducting wires and a line width of each of the second conducting wires are 50 nm-10 μm.

8. The touch panel according to claim 2, wherein a vertical distance between the first conductive bus and the second conductive bus is 2.5 mm-3.5 mm.

9. The touch panel according to claim 8, wherein a vertical distance between any two adjacent first conductive buses is 7.5 mm-8.5 mm.

10. The touch panel according to claim 9, wherein the plurality of first conducting wires and the plurality of second conducting wires are arranged in a same layer.

11. The touch panel according to claim 10, wherein the plurality of first conducting wires and the plurality of second conducting wires are arranged in different layers, and an insulating layer is further disposed between the plurality of first conducting wires and the plurality of second conducting wires.

12. The touch panel according to claim 1, wherein a distance between any two adjacent conducting wires in the first conducting wires and the second conducting wires is 50 nm-140 nm.

13. The touch panel according to claim 1, wherein at least every two of adjacent first conducting wires of the plurality of first conducting wires constitute a first conducting wire group, at least every two of adjacent second conducting wires of the plurality of second conducting wires constitute a second conducting wire group, and the first conducting wire group and the second conducting wire group are alternately arranged.

14. A touch display device, comprising the touch panel according to claim 1, further comprising: gate lines and data lines disposed on the base substrate, wherein
the first conducting wires and the second conducting wires are parallel to the data lines and the first conductive bus and the second conductive bus are parallel to the gate lines; or
the first conducting wires and the second conducting wires are parallel to the gate lines and the first conductive bus and the second conductive bus are parallel to the data lines.

15. A touch display device, comprising the touch panel according to claim 1, further comprising: an array substrate arranged opposite to the base substrate, wherein
the array substrate includes gate lines and data lines, the first conducting wires and the second conducting wires are parallel to the data lines and the first conductive bus and the second conductive bus are parallel to the gate lines; or
the first conducting wires and the second conducting wires are parallel to the gate lines and the first conductive bus and the second conductive bus are parallel to the data lines.

16. A method for manufacturing a touch panel, comprising:
providing a base substrate; and
forming a driving electrode and a sensing electrode on the base substrate, wherein
the driving electrode includes a plurality of first conducting wires and a first conductive bus for connecting the plurality of first conducting wires, the sensing electrode includes a plurality of second conducting wires and a second conductive bus for connecting the plurality of second conducting wires, and the plurality of first conducting wires and the plurality of second conducting wires are alternately arranged,
wherein the first conductive bus and the second conductive bus are disposed to be parallel to each other, and in a direction parallel to an extending direction of the first conductive bus and the second conductive bus, the plurality of first conducting wires and the plurality of second conducting wires are alternately arranged.

17. The method for manufacturing the touch panel according to claim 16, wherein the plurality of first conducting wires and the plurality of second conducting wires are parallel to each other.

18. The method for manufacturing the touch panel according to claim 17, wherein the first conducting wires and the second conducting wires are formed by nanoimprint or holographic lithography.

19. The method for manufacturing the touch panel according to claim 16, further comprising:
forming a black matrix on the base substrate,
wherein orthographic projections of the first conductive bus and the second conductive bus on the base substrate are located within an orthographic projection of the black matrix on the base substrate.

20. The method for manufacturing the touch panel according to claim 19, further comprising:
forming a color filter layer on the base substrate,
wherein orthographic projections of the plurality of first conducting wires and the plurality of second conducting wires on the base substrate are located within orthographic projections of the black matrix and the color filter layer on the base substrate.

* * * * *